(12) United States Patent
Nagashima (10) Patent No.: US 7,716,529 B2
(45) Date of Patent: May 11, 2010

(54) SYSTEM LSI

(75) Inventor: Takayuki Nagashima, Yokohama (JP)

(73) Assignee: Canon Kabushiki Kaisha (JP)

( * ) Notice: Subject to any disclaimer, the term of this patent is extended or adjusted under 35 U.S.C. 154(b) by 374 days.

(21) Appl. No.: 11/754,007

(22) Filed: May 25, 2007

(65) Prior Publication Data

US 2008/0010540 A1    Jan. 10, 2008

(30) Foreign Application Priority Data

May 26, 2006    (JP)    ............................. 2006-146611

(51) Int. Cl.
*G06F 11/00*    (2006.01)
(52) U.S. Cl. ...................................... 714/34
(58) Field of Classification Search .................... 714/34
See application file for complete search history.

(56) References Cited

U.S. PATENT DOCUMENTS 6,289,473 B1 * 9/2001 Takase ....................... 714/35
6,857,084 B1 * 2/2005 Giles ........................... 714/35

FOREIGN PATENT DOCUMENTS

JP    2002-230065 A    8/2002

* cited by examiner

*Primary Examiner*—Michael C Maskulinski
(74) *Attorney, Agent, or Firm*—Rossi, Kimms & McDowell LLP

(57) ABSTRACT

A system LSI which is capable of precisely acquiring the status of a module which is referred to as a resource for debugging when a high-performance processor debugs a processing program executed by a small-scale processor. A function unit has a bus interface connected to a bus and a data processing unit. The function unit is controlled in accordance with a processing program. The processing program is debugged in accordance with a debug program. Functioning of the data processing unit is halted. The function unit control processor suspends execution of the processing program to assert a debug signal when the processing program satisfies a predetermined condition. The halting unit halts functioning of the data processing unit without halting the bus interface in the function unit when the debug signal becomes asserted. The debugging processor acquires a status of the data processing unit when the debugging processor detecting that the debug signal is asserted.

8 Claims, 6 Drawing Sheets

SYSTEM LSI

BACKGROUND OF THE INVENTION

1. Field of the Invention

The present invention relates to a system LSI which debugs a program.

2. Description of the Related Art

Many system LSIs for high-end systems are equipped with high-performance, advanced processors. More and more system LSIs are being equipped with dual processors for further enhanced speed.

There is also available a system LSI which implements complicated functions by including a large number of small-scale processors instead of a high-performance processor and causing the processors to work in concert with each other (see, e.g., Japanese Laid-Open Patent Publication (Kokai) No. 2002-230065). This system LSI causes each processor to control a function module or causes the processors to execute a program for them to operate a function module in concert with each other. As described above, a small-scale processor executes a program alone or executes part of a program while working in concert with selected processors, thereby implementing a scenario based on a broader concept.

Figure 6:
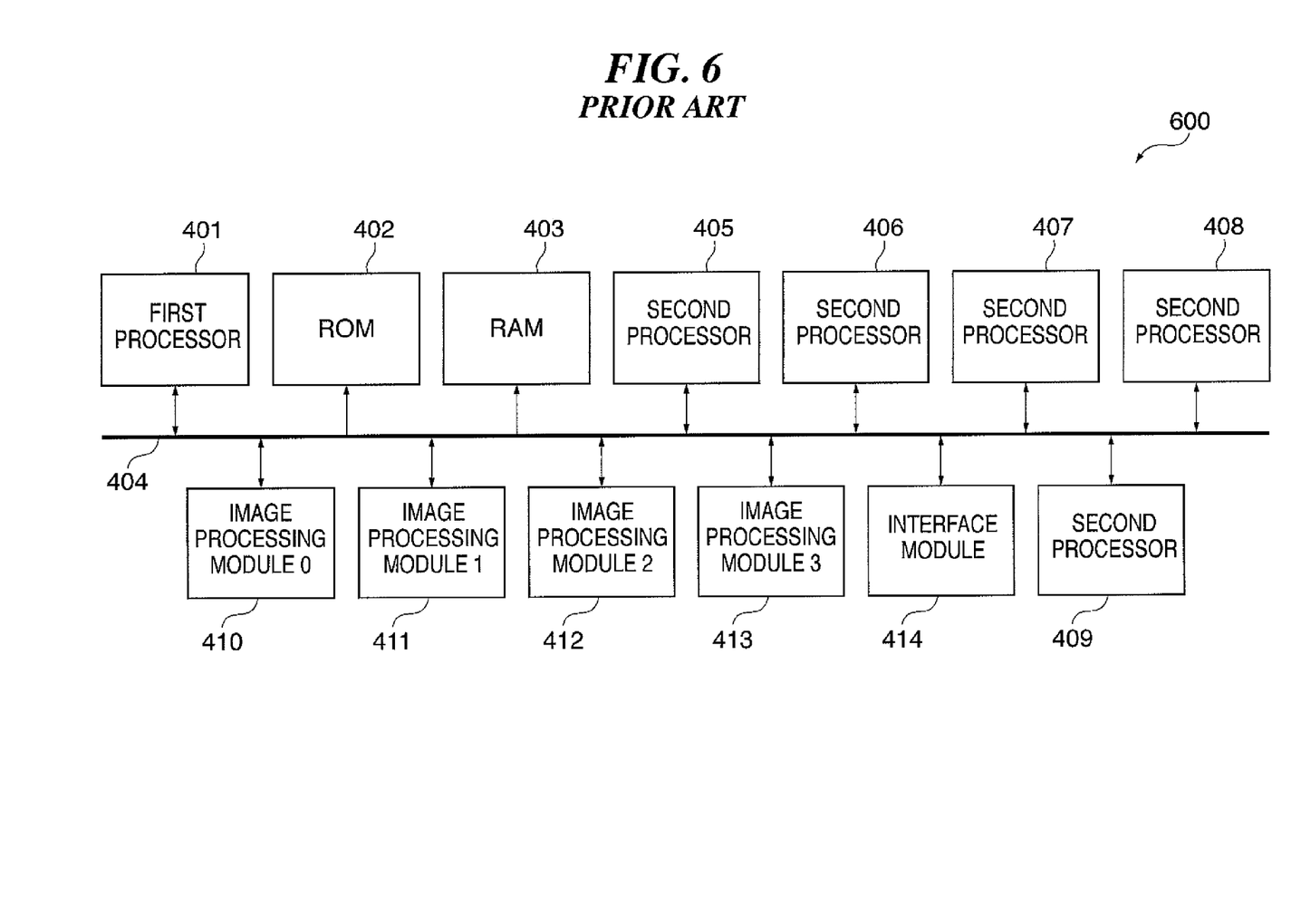
FIG. 6 is a block diagram showing the configuration of a conventional system LSI including a high-performance processor and small-scale processors.

FIG. 6 is a block diagram showing the configuration of a conventional system LSI including a high-performance processor and small-scale processors. A system LSI 600 in FIG. 6 is mainly composed of a first processor 401, a ROM 402, a RAM 403, second processors 405 to 409, image processing modules 410 to 413, and an I/F module 414.

The first processor 401 is a high-performance processor which controls the entire system LSI 600 in accordance with a program. The ROM 402 stores a program. The RAM 403 is used as a work area for the processors 401 and 405 to 409 or used to pass data between component modules. A bus 404 sends and receives data between the components of the system LSI 600.

The second processors 405 to 409 are each a small-scale processor which executes an arbitrary program in accordance with an instruction from the first processor 401. The image processing modules 410 to 413 are function modules. The interface (I/F) module 414 is a function module which passes an instruction or data to/from the outside.

In the system LSI 600 with this configuration, the second processor 405 mainly controls the image processing module 410. Similarly, the second processors 406 to 408 mainly control the image processing modules 411 to 413 corresponding thereto, respectively. The second processor 409 mainly controls the interface module 414.

The first processor 401 debugs programs which are respectively executed by the second processors 405 to 409. In the processing, the first processor 401 first sends a command to single-step or notification of a breakpoint to each of the second processors 405 to 409 and suspends the programs serving as objects for debugging, which are being executed by the second processors 405 to 409, when respective predetermined steps end. The first processor 401 then acquires the statuses of the modules 410 to 414, which are mainly controlled by the second processors 405 to 409, and finds and fixes bugs in the programs executed by the second processors 405 to 409 by using the statuses as a resource to be referred to in the debugging.

However, the system LSI 600 has the following problem when debugging, by the above-described method, the programs executed by the second processors 405 to 409. More specifically, even if execution of the programs by the second processors 405 to 409 is suspended, it is impossible to acquire the correct statuses of the modules 410 to 414 originally desired to be monitored when the operation of the modules 410 to 414 is not suspended and still continues.

SUMMARY OF THE INVENTION

The present invention provides a system LSI capable of precisely acquiring the status of a module which is referred to as a resource for debugging when a high-performance processor debugs a processing program executed by a small-scale processor.

In a fist aspect of the present invention, there is provided a system LSI comprising: a function unit having a bus interface connected to a bus and a data processing unit; a function unit control processor adapted to control the function unit in accordance with a processing program; a debugging processor adapted to debug the processing program in accordance with a debug program; and a halting unit adapted to halt functioning of the data processing unit, wherein the function unit control processor suspends execution of the processing program to assert a debug signal when the processing program satisfies a predetermined condition, the halting unit halts functioning of the data processing unit without halting the bus interface in the function unit when the debug signal becomes asserted, and the debugging processor acquires a status of the data processing unit when the debugging processor detecting that the debug signal is asserted.

With this arrangement, it is possible to suspend execution of the processing program executed by the function unit control processor if the processing program satisfies the predetermined condition. Examples of satisfaction of the predetermined condition include execution of a single step and arrival at a set breakpoint. At this time, operation of the data processing unit in the function unit serving as an object for control of the function unit control processor is also suspended. The debugging processor monitors the status of the data processing unit when it detects that the debug signal is asserted. This makes it possible to precisely acquire the status of a data processing unit which is referred to as a resource for debugging when a high-performance processor debugs a processing program executed by a small-scale processor.

The halting unit can halt functioning of the data processing unit by suspending supply of a clock to the data processing unit while the debug signal remains asserted.

With this arrangement, it is possible to easily perform control to halt functioning of the data processing unit without halting the bus interface in the function unit at the moment when the debug signal becomes asserted.

In a second aspect of the present invention, there is provided a system LSI comprising: a plurality of function units each having a bus interface connected to a bus and a data processing unit; a plurality of function unit control processors each adapted to control the plurality of function units in accordance with a processing program; a debugging processor adapted to debug the processing program in accordance with a debug program; a plurality of halting units corresponding to the plurality of function units and adapted to halt functioning of the respective data processing unit, and a relay unit adapted to relay a debug signal from the plurality of function unit control processors to the plurality of halting units, wherein each of the plurality of function unit control processors suspends execution of the processing program to assert the debug signal when the processing program satisfies a predetermined condition, the debugging processor sets relay information to the relay unit, the relay information specifying that the debug signal is relayed from the function unit control processor executing the processing program to be debugged to the halting unit corresponding to the data processing unit in the function unit controlled by the function unit control processor, the relay unit relays the debug signal from the function unit control processor to the halting unit based on the specification in accordance with the relay information, the halting unit halts functioning of the data processing unit without halting the bus interface in the corresponding function unit when the debug signal relayed from the relay unit becomes asserted, and the debugging processor acquires a status of the data processing unit when detecting that the debug signal is asserted.

With this arrangement, it is possible to make application of the system LSI to a plurality of function units easy.

Further features and aspects of the present invention will become apparent from the following detailed description of exemplary embodiments with reference to the attached drawings.

DETAILED DESCRIPTION OF THE PREFERRED EMBODIMENTS

The following description of exemplary embodiments, features and aspects of the present invention is merely illustrative in nature and is in no way intended to limit the invention, its application, or uses.

Figure 1:
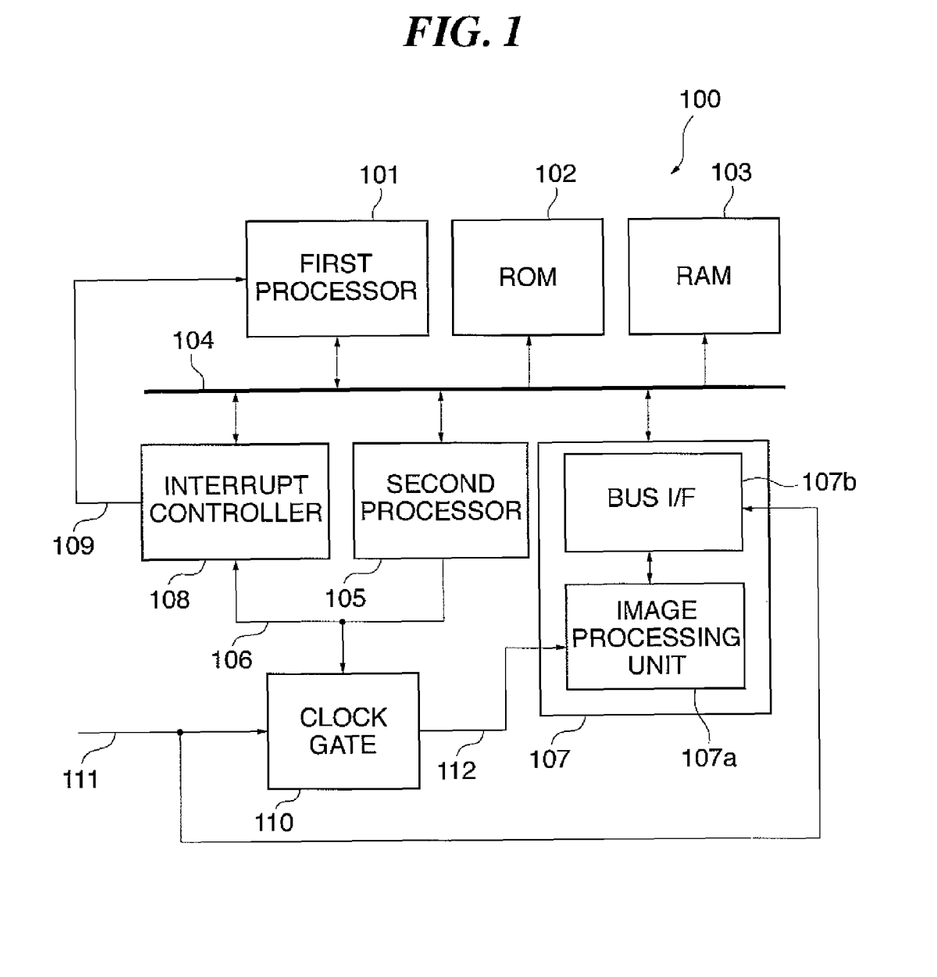
FIG. 1 is a diagram showing the configuration of a system LSI according to a first embodiment of the present invention.

FIG. 1 is a diagram showing the configuration of a system LSI according to a first embodiment of the present invention. Referring to FIG. 1, a system LSI 100 is mainly composed of a first processor 101, a ROM 102, a RAM 103, an interrupt controller 108, a second processor 105, an image processing module 107, and a clock gate 110.

The first processor 101 controls the entire system LSI 100 in accordance with a program and is a high-performance processor which executes a debug program. The ROM 102 stores a program to be executed by a processor. The RAM 103 is used as a work area for the processors or used to pass data between component modules. A system bus 104 sends and receives data between the components of the system LSI 100.

The second processor 105 is a small-scale processor and executes an arbitrary program in accordance with an instruction from the first processor 101. In addition to this, the second processor 105 has a debug support function including single-step and breakpoint functions. When the second processor 105 detects occurrence of a debug trigger, it suspends a program being executed, shifts to debug mode, and asserts a debug signal. Assertion/deassertion of a debug signal 106 is controlled by the second processor 105.

The image processing module 107 has an image processing unit 107a and a bus I/F 107b which are separated into different clock domains. The image processing unit 107a has a status register (not shown) which stores a status. The interrupt controller 108 issues an interrupt request to the first processor 101 by asserting an interrupt request signal 109 to the first processor 101.

The clock gate 110 controls supply of a clock input to the image processing unit 107a in the image processing module 107. While the debug signal 106 remains asserted, supply of the clock is suspended. A clock 111 is supplied to the clock gate 110 and bus I/F 107b.

There will be described the debug support function of the system LSI 100 with the above-described configuration at the time of debugging a program executed by the second processor 105. In this embodiment, a program serving as an object for debugging which is executed by the second processor 105 controls the image processing module 107. A debug program for debugging the program executed by the second processor 105 is executed by the first processor 101. Note that at the time of debugging, the second processor 105 may suspend execution of the program at the end of each step or may suspend the execution when the program reaches a breakpoint set in advance. A case will be described here where a breakpoint is set.

Figure 2:
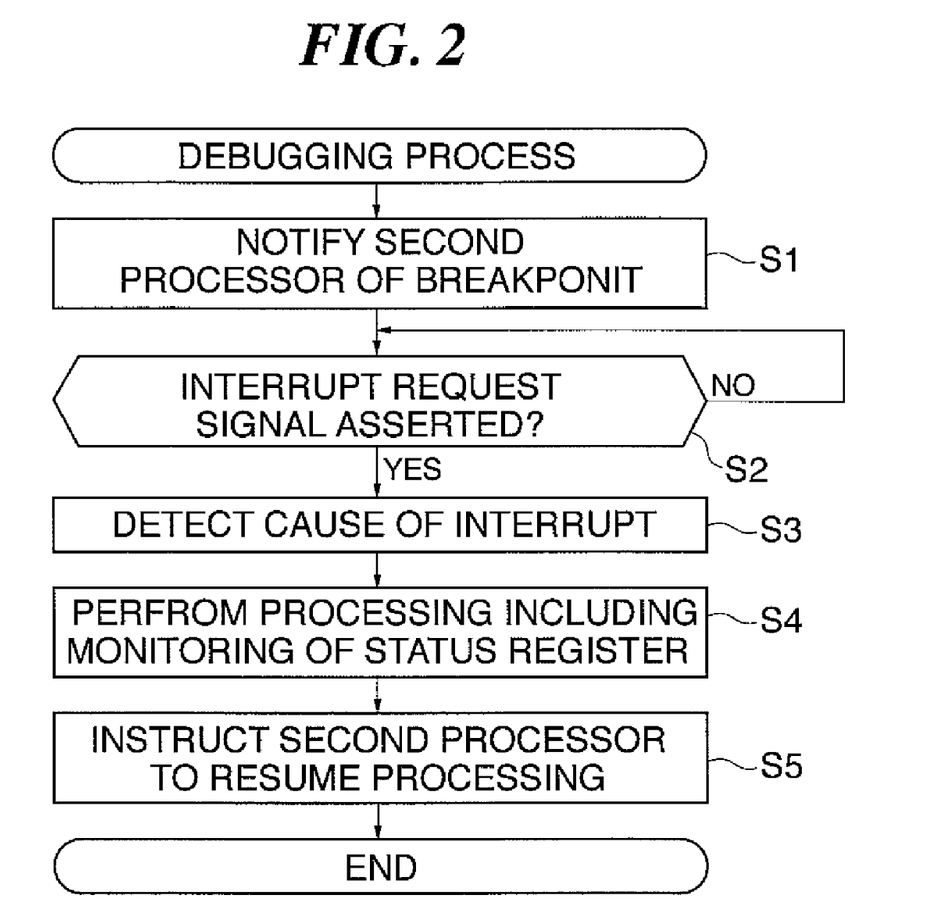
FIG. 2 is a flowchart showing the procedure of a debugging process executed by a first processor in FIG. 1.

FIG. 2 is a flowchart showing the procedure of a debugging process executed by the first processor 101 in FIG. 1. A program for the debugging is stored in the ROM 102. Referring to FIG. 2, the first processor 101 first notifies the second processor 105 of a breakpoint (step S1).

The first processor 101 then determines whether or not the interrupt request signal 109 from the interrupt controller 108 is asserted (step S2). When the interrupt request signal 109 becomes asserted, the first processor 101 reads the contents of an interrupt cause register (not shown) in the interrupt controller 108 and detects a cause of interrupt (step S3). For example, assume here that the first processor 101 detects, as the cause of interrupt, that the second processor 105 has entered debug mode and asserted the debug signal 106.

The first processor 101 performs predetermined processing including monitoring of the status register in the second processor 105 and one in the image processing module 107 (step S4). At this time, the bus I/F 107b continues operation even if the second processor 105 suspends processing, and the image processing unit 107a suspends operation, as will be described later. Accordingly, the bus I/F 107b allows bus access from the first processor 101. The first processor 101 can read the contents in the status registers while the values of the contents immediately before the debug signal 106 becomes asserted are maintained. After the predetermined processing, the first processor 101 instructs the second processor 105 to resume processing (step S5), followed by terminating the process.

Figure 3:
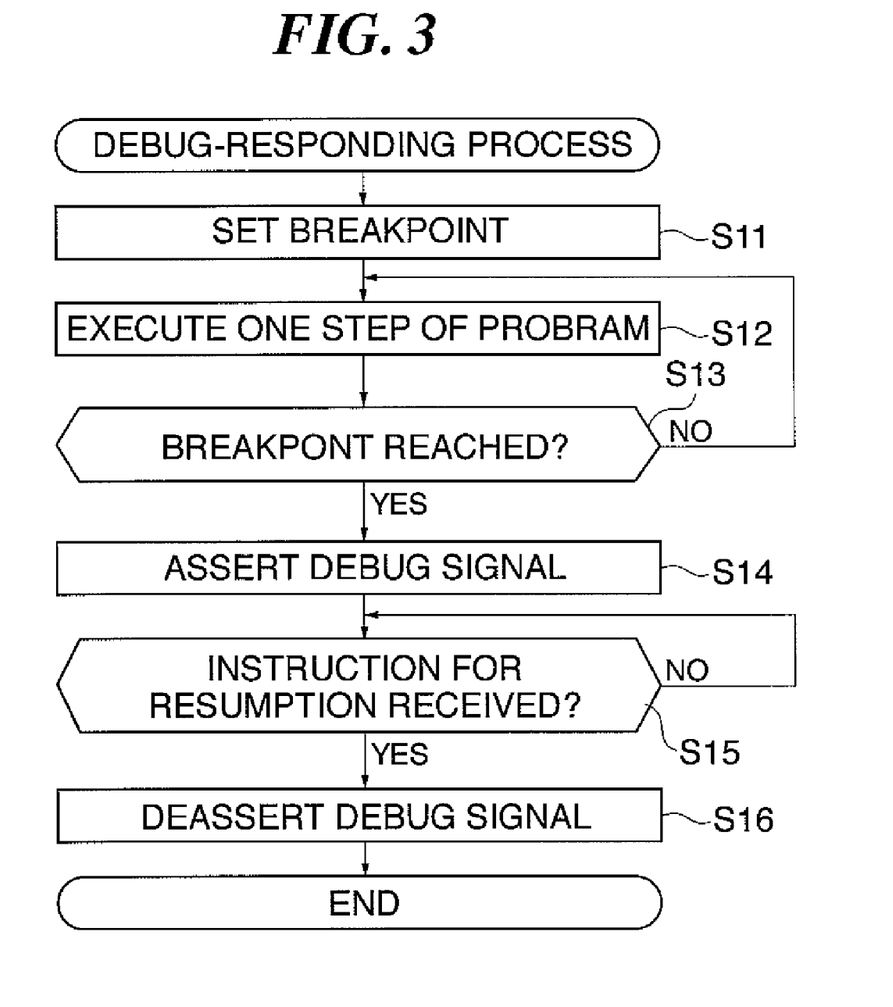
FIG. 3 is a flowchart showing the procedure of a debug-responding process executed by a second processor in FIG. 1 when notification of a breakpoint is received from the first processor.

FIG. 3 is a flowchart showing the procedure of a debug-responding process executed by the second processor 105 when notification of a breakpoint is received from the first processor 101. Referring to FIG. 3, the second processor 105 sets the breakpoint, of which it is notified by the first processor 101 (step S11). The second processor 105 executes one step of a program serving as an object for debugging (step S12). After execution of the one step, the second processor 105 determines whether or not the breakpoint is reached (step S13). If the breakpoint is not reached, the process returns to step S12 to execute the next step.

On the other hand, as the result of the determination in step S13, when the breakpoint is reached, the second processor 105 suspends execution of the program and asserts the debug signal 106 (step S14). The debug signal 106 is input to the interrupt controller 108 and to the clock gate 110. When the debug signal 106 becomes asserted, the interrupt controller 108 asserts the interrupt request signal 109 and makes an interrupt request to the first processor 101. At the same time, i.e., when debug signal 106 becomes asserted, the clock gate 110 halts supply of a clock signal 112 to the image processing unit 107a in the image processing module 107. As a result, the image processing unit 107a suspends processing while maintaining stored contents in the status register. In the meantime, the clock signal 111 is continuously supplied to the bus I/F 107b, and the bus I/F 107b continues operation.

After that, when the second processor 105 receives an instruction for resumption from the first processor 101 (YES in step S15), it deasserts the debug signal 106 (step S16). After step S16, the process ends. When the debug signal 106 becomes deasserted, the clock gate 110 resumes supply of the clock signal 112 to the image processing unit 107a in the image processing module 107. As a result, the image processing unit 107a resumes processing and performs updating of the status register, which has been suspended.

As described above, when the breakpoint is reached, in the system LSI 100 of the first embodiment, the second processor 105 suspends execution of the program serving as the object for debugging, and at the same time, the image processing module 107 suspends image processing being executed. The image processing module 107 postpones updating of the status register until the deassertion of the debug signal 106. This makes it possible to prevent the status associated with the program serving as the object for debugging from being rewritten during suspension of execution of the program serving as the object for debugging. Accordingly, it is possible to read out the status originally desired to be monitored when the second processor 105 is in debug mode. Note that although in this embodiment, the processing of the second processor is halted at a breakpoint, the processing may be halted at the end of each step.

Figure 4:
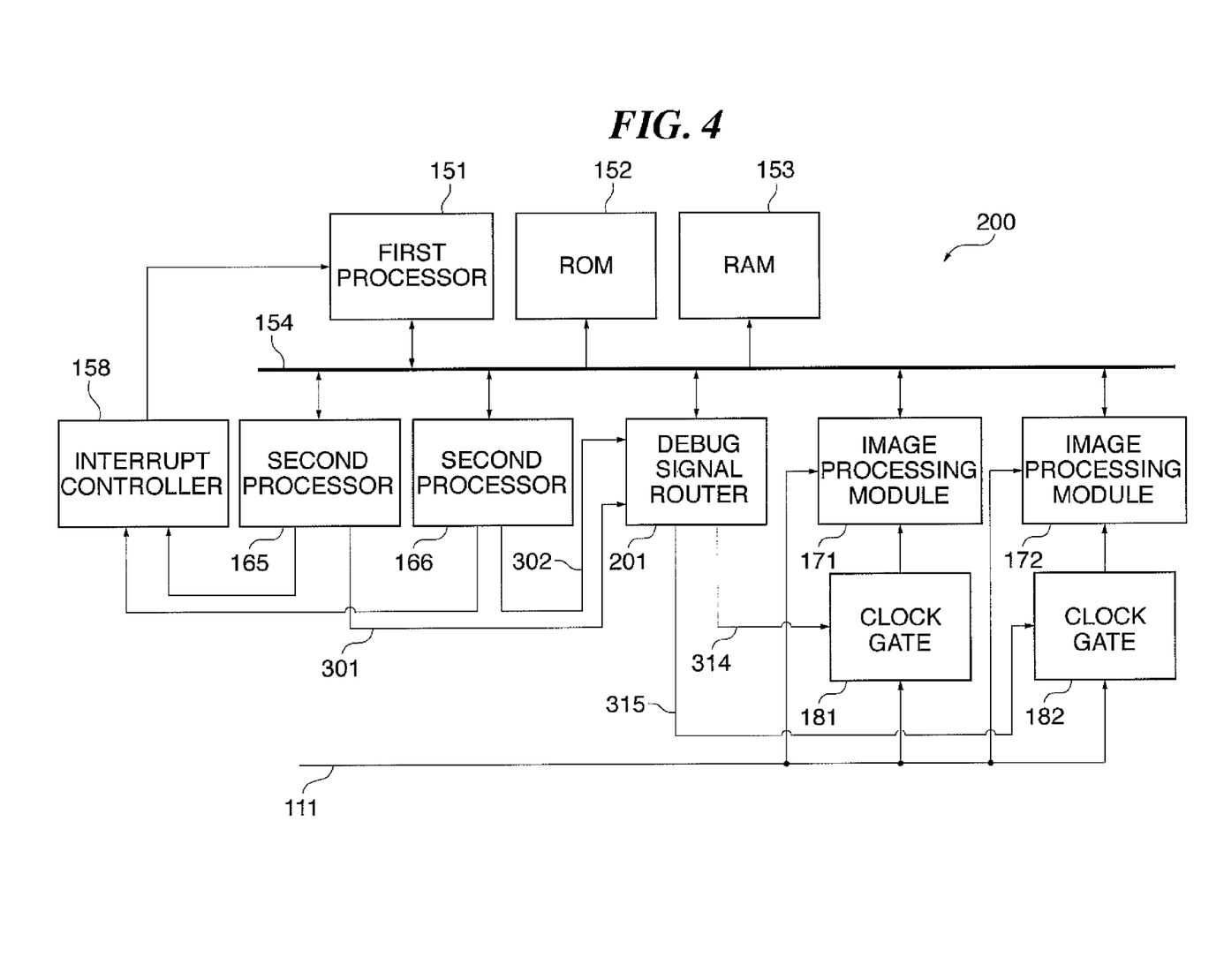
FIG. 4 is a diagram showing the configuration of a system LSI according to a second embodiment of the present invention.

FIG. 4 is a diagram showing the configuration of a system LSI 200 according to a second embodiment of the present invention. Referring to FIG. 4, in the second embodiment, the system LSI 200 has a plurality of second processors and a plurality of image processing modules. The system LSI 200 has a debug support function capable of coping with a case where each second processor selects an arbitrary one of the image processing modules as the main object for control.

More specifically, the system LSI 200 has a first processor 151, a ROM 152, a RAM 153, a system bus 154, an interrupt controller 158, and second processors 165 and 166. The system LSI 200 also has a debug signal router 201, image processing modules 171 and 172, and clock gates 181 and 182. The configurations and operations of the components are the same as those of the first embodiment except for the debug signal router 201. The image processing modules 171 and 172 each have a bus I/F and an image processing unit, as in the image processing module 107 of the first embodiment. The debug signal router 201 relays a debug signal from each of the plurality of second processors 165 and 166 to an arbitrary one of the clock gates 181 and 182.

Figure 5:
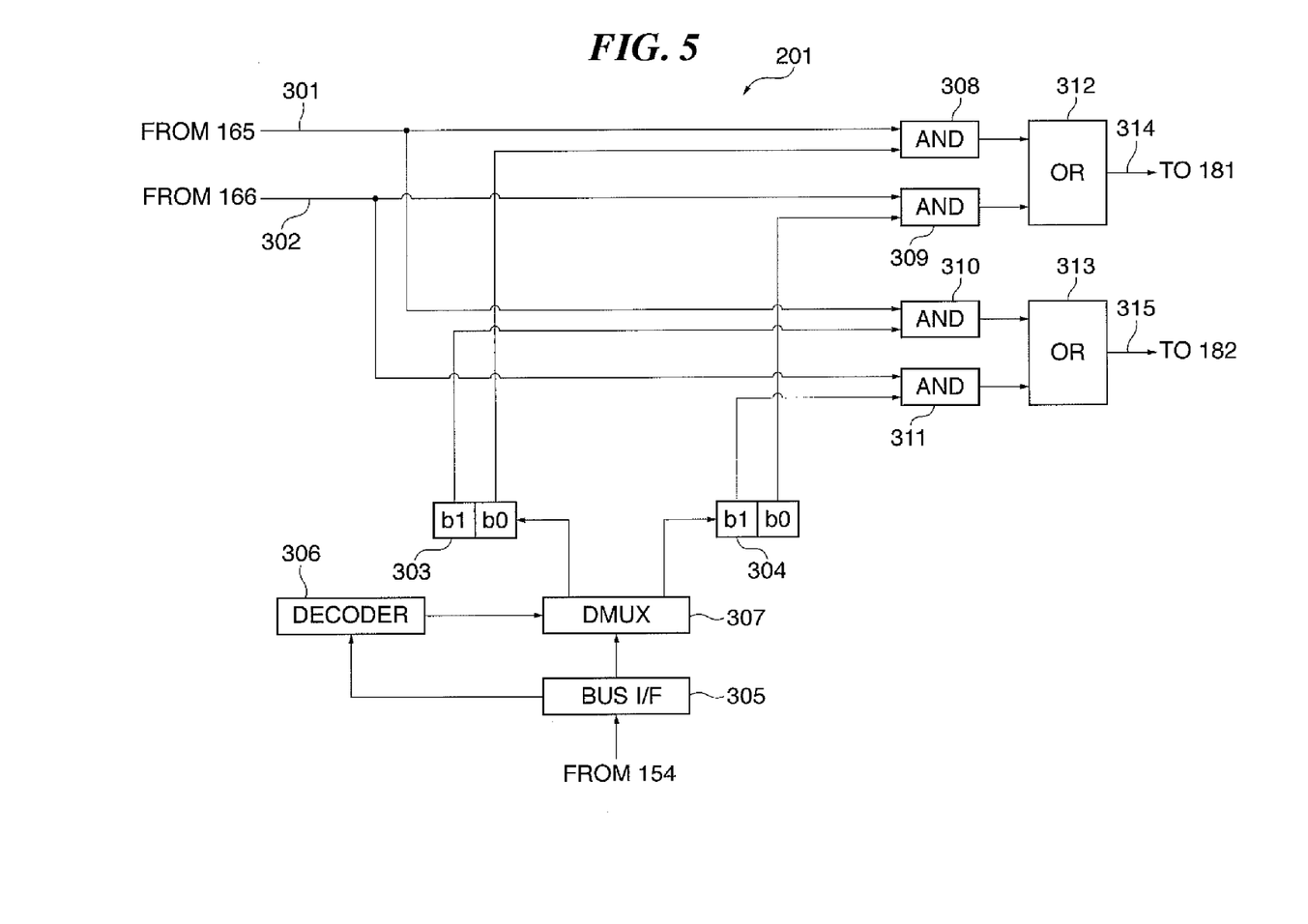
FIG. 5 is a diagram showing the configuration of a debug signal router in FIG. 4.

FIG. 5 is a diagram showing the configuration of the debug signal router 201 in FIG. 4. Referring to FIG. 5, the debug signal router 201 has registers 303 and 304, a bus interface 305, a decoder 306, and a demultiplexer (DMUX) 307. The debug signal router 201 further has AND gates 308, 309, 310, and 311 and OR gates 312 and 313.

The register 303 controls relaying of a debug signal 301 output from the second processor 165. Similarly, the register 304 controls relaying of a debug signal 302 output from the second processor 166. The register 303 has a bit b0 corresponding to the image processing module 171 and a bit b1 corresponding to the image processing module 172. Similarly, the register 304 has a bit b0 corresponding to the image processing module 171 and a bit b1 corresponding to the image processing module 172.

The bus interface 305 interfaces with the system bus 154. The decoder 306 decodes an address in a request for access to the debug signal router 201 sent from the bus interface 305. The demultiplexer (DMUX) 307 outputs data sent from the bus interface 305 to any one of the registers 303 and 304 on the basis of the result of the address decoded by the decoder 306.

The two-input, one-output AND gates 308 and 309 and OR gate 312 obtain a debug signal 314 which is input to the clock gate 181 from the debug signals 301 and 302 to control supply of a clock to the image processing module 171. Similarly, the two-input, one-output AND gates 310 and 311 and OR gate 313 obtain a debug signal 315 which is input to the clock gate 182 from the debug signals 301 and 302 to control supply of a clock to the image processing module 172.

The system LSI 200 with the above-described configuration has a debug support function executed at the time of debugging programs executed by the second processors 165 and 166. Since debugging in this embodiment is the same as that in the first embodiment, a description thereof will be omitted, and only differences in operation from the first embodiment will be described here. In the second embodiment, when a debug signal becomes asserted, it is relayed to a clock gate corresponding to an image processing module selected in advance via the debug signal router 201, and suspends supply of the clock to the selected image processing module. The details of the relaying operation will be described. Assume here that a program executed by the second processor 165 is to be debugged and the second processor 165 controls the image processing module 171.

First, a user instructs the first processor 151 to execute a debug program. In response to the instruction, the first processor 151 writes a value 1 and a value 0 to the bits b0 and b1, respectively, of the register 303 in the debug signal router 201 and notifies the second processor 165 of a breakpoint to be set. At this time, a bus access request from the first processor 151 is input to the bus interface 305 in the debug signal router 201 through the system bus 154. An address in the bus access request is decoded by the decoder 306, and the demultiplexer 307 accesses the register 303 in accordance with the decoding result. With this operation, set values (in this example, bit b1: value 0, bit b0: value 1) are written to the register 303.

When the second processor 165 executes a program serving as an object for debugging, and the breakpoint is reached, the second processor 165 suspends the program serving as the object for debugging, shifts to debug mode, and asserts the debug signal 301 (sets the debug signal 301 to 1).

In the debug signal router 201, the asserted debug signal 301 is input to the AND gate 308 together with the value (1) of the bit b0 in the register 303 set in advance, and the logical AND (1) of the inputs is computed. The OR gate 312 computes the logical OR of outputs from the AND gates 308 and 309 and outputs the computed logical OR (1) as the debug signal 314 to the clock gate 181 corresponding to the image processing module 171.

When the debug signal 314 becomes asserted (is set to 1), the clock gate 181 suspends supply of a clock signal 111 to the image processing module 171.

With this operation, the image processing module 171 halts the operation of the components including the image processing unit except for the bus I/F (not shown), to which the clock signal 111 is continuously supplied not via the clock gate 181.

Accordingly, the image processing module 171 maintains a status immediately before supply of the clock signal from the clock gate 181 is halted.

As described above, according to the system LSI 200 of the second embodiment, the status of the image processing module 171 at the moment when the second processor 165 suspends the program serving as the object for debugging can be maintained. Accordingly, it is possible to read out the status originally desired to be monitored when the second processor 165 is in debug mode.

Note that although the above-described embodiment has described a case where only the status of the image processing module 171 is read out, only the status of the image processing module 172 may, of course, be read out. In this case, the bits b1 and b0 of the register 303 are set to a value 1 and a value 0, respectively. If the statuses of both the image processing modules 171 and 172 are simultaneously read out, it suffices to set both the bits b0 and b1 of the register 303 to a value 1. It is also possible to perform debugging of a program executed by the second processor 166, like the debugging of the program executed by the second processor 165. It goes without saying that the number of second processors, the number of functional processing modules, and the like may be arbitrarily set.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD–RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-146611 filed May 26, 2006, which are hereby incorporated by reference herein in its entirety.

What is claimed is:

1. A system LSI comprising:
   a function unit including a bus interface and a data processing unit, the bus interface connected to a bus and the data processing unit;
   a function unit control processor adapted to control said function unit in accordance with a processing program, or to suspend execution of the processing program to assert a debug signal when the processing program satisfies a predetermined condition;
   a debugging processor adapted to acquire a status of said data processing unit when the debug signal is asserted; and
   a halting unit adapted to halt functioning of said data processing unit without halting said bus interface in said function unit when said debug signal becomes asserted.

2. A system LSI as claimed in claim 1, wherein
   said halting unit halts functioning of said data processing unit by suspending supply of a clock to said data processing unit while the debug signal remains asserted.

3. A system LSI as claimed in claim 1, wherein
   said debugging processor notifies said function unit control processor of a breakpoint, and
   said function unit control processor suspends execution of the processing program to assert the debug signal, when the function unit control processor receives the notification of the breakpoint.

4. A system LSI comprising:
   a plurality of function units each including (a) a bus interface and a data processing unit, the bus interface connected to a bus and the data processing unit;
   a plurality of function unit control processors each adapted to control a corresponding one of said plurality of function units in accordance with a processing program, or to suspend execution of the processing program to assert a debug signal when the processing program satisfies a predetermined condition;
   a debugging processor adapted to acquire a status of one of the data processing units when the debug signal is asserted by the corresponding function unit control processor;
   a plurality of halting units corresponding to said plurality of function units and adapted to halt functioning of the respective data processing unit without halting the respective bus interface when the debug signal becomes asserted by the corresponding function unit control processor; and
   a relay unit adapted to relay a debug signal from one of said plurality of function unit control processors to a corresponding one of said plurality of halting units.

5. A system LSI as claimed in claim 4, wherein
   each of said plurality of halting unit halts functioning of the corresponding data processing unit by suspending supply of a clock to said data processing unit while the debug signal remains asserted.

6. A system LSI as claimed in claim 4, wherein
   said debugging processor notifies a particular function unit control processor executing a processing program to be debugged of a breakpoint, and
   said particular function unit control processor suspends execution of the processing program to assert the debug signal, when the particular function unit control processor receives the notification of the breakpoint.

7. A method implemented by an LSI system comprising (a) a function unit including a bus interface and a data processing unit, the bus interface connected to a bus and the data processing unit, (b) a function unit control processor, (c) a debugging processor, and (d) a halting unit, the method comprising:
- a controlling step, performed by the function unit control processor, of controlling the function unit in accordance with a processing program;
- a suspension step, performed by the function unit control processor, of suspending execution of the processing program to assert a debug signal when the processing program satisfies a predetermined condition;
- a status acquisition step, performed by the debugging processor, of acquiring a status of the data processing unit when the debug signal is asserted; and
- a halting step, performed by the halting unit, of halting functioning of the data processing unit without halting the bus interface in the function unit when the debug signal becomes asserted.

8. A method implemented by an LSI system comprising (a) a plurality of function units each including a bus interface and a data processing unit, the bus interface connected to a bus and the data processing unit, (b) a plurality of function unit control processors corresponding to the plurality of function units, (c) a debugging processor, (d) a plurality of halting units corresponding to the plurality of function units, and (e) a relay unit, the method comprising:
- a controlling step, performed by each of the plurality of function unit control processors, of controlling a corresponding one of the plurality of function units in accordance with a processing program;
- a suspension step, performed by each of the plurality of function unit control processors, of suspending execution of the respective processing program to assert a debug signal when the processing program satisfies a predetermined condition;
- a status acquisition step, performed by the debugging processor, of acquiring a status of one of the data processing units when the debug signal is asserted by the corresponding function unit control processor;
- a halting step, performed by each of the halting units, of halting functioning of the respective data processing unit without halting the respective bus interface when the debug signal becomes asserted by the corresponding function unit control processor; and
- a relay step, performed by the relay unit, of relaying at least a debug signal from one of the plurality of function unit control processors to a corresponding one of the plurality of halting units.

\* \* \* \* \*